(No Model.)

S. H. RICE.
ABSTRACT BOOK FOR COUNTY RECORDS.

No. 561,240. Patented June 2, 1896.

Witnesses,
J. H. Towse
H. F. Ascheck

Inventor,
Samuel H. Rice
By Dewey & Co.
attys

UNITED STATES PATENT OFFICE.

SAMUEL H. RICE, OF UKIAH, CALIFORNIA, ASSIGNOR TO SARAH RICE, OF SAME PLACE.

ABSTRACT-BOOK FOR COUNTY RECORDS.

SPECIFICATION forming part of Letters Patent No. 561,240, dated June 2, 1896.

Application filed November 1, 1895. Serial No. 567,627. (No specimens.)

*To all whom it may concern:*

Be it known that I, SAMUEL H. RICE, a citizen of the United States, residing at Ukiah, county of Mendocino, State of California, have invented an Improvement in Abstract-Books for County Records; and I hereby declare the following to be a full, clear, and exact description of the same.

My invention relates to an improved means for conveniently keeping county records and abstracts of land and titles.

It consists in certain details of construction which will be more fully explained by reference to the accompanying drawing, in which the figure represents two opposite pages in my book, one representing the plot and the other the entry page.

The object is to provide a simple method for marking and laying out tracts of land, simplifying and making the plotting easy, and providing for the entry in conjunction with the plot, of references to all instruments affecting the title of the lands contained in the sections shown upon the opposite page.

The abstract of records is made by books—that is, I commence by making an abstract of every instrument upon slips, which may be about five by nine inches, and when they are compared with the records they are bound permanently into book form. The whole record of the county may be treated in this manner and this abstract becomes, in effect, a duplicate of the county records. The text-matter taken from the records may be as full as the abstracter sees fit to make it, and is entirely at the discretion of the person making the abstract.

In my invention I prefer to use two form-books, one for the entry of regular legal subdivisions and the other for the entry of towns, grants, and irregular subdivisions.

A and B represent two pages of the book, which may be of any suitable or desired size, such as thirteen by fifteen inches. The left page A is entirely taken up by a plot and the right is ruled for entries. This plot shown at A is for the entry of four sections, and has these sections lithographed upon it to a scale of, say, fifteen chains to the inch. The whole plot is cross-sectioned at each chain and every twentieth line of the cross-sectioning is made enough heavier so as to readily distinguish the lines of the forty-acre tracts. Around the outer edge of the plot of the four sections are marked the degrees of a circle, the line running up and down through the center of the page being marked "0" at top and bottom, and the degrees are numbered right and left to ninety degrees from this line. With this plot I use a parallel-ruler of the usual well-known construction for drawing instruments, this ruler being graduated on a scale of fifteen chains to the inch, the same as the plot. The object of this cross-sectioning and the marking of the degrees and minutes is to enable the user to plot any irregular subdivision, and by the use of the parallel-ruler any course other than the cardinal points may be laid at once without fixing a meridian or adjusting the old style of protractor. This is done by placing one bar of the ruler upon the intersection of the vertical degree-line at its intersection with the horizontal ninety-degree line and at the desired angle, as indicated by the marginal scale. The other bar may then be moved to intersect the point of beginning and the course and distance taken at once from the scale marked upon the ruler. Each course is thus marked until the plot is complete. The right page of the book, which may also be lithographed, is ruled for the entries of reference to all instruments affecting the title to the towns, grants, and irregular subdivisions, as will be seen by inspection, where the patents, deeds, mortgages, liens of all descriptions, &c., are entered under the proper headings.

The symbols the designation of the sections, as "Northeast," "Northwest," "Southwest," "Southeast," and the book and page are marked in the left-hand column upon the horizontal lines.

Upon each side of the plot on the left-hand page are subdivisions, as shown at D, in which the symbols adopted to designate the various subdivisions are entered for reference.

If the book is to be used upon regular subdivisions, the plot is similar in all respects to that here described.

The ruling of the opposite page is also the same, with the exception that the designation "Northeast," "Northwest," &c., may be omitted.

These two forms cover everything that can be plotted and enable the abstracter to do the work with accuracy and celerity.

Having thus described my invention, what I claim as new, and desire to secure by Letters Patent, is—

1. The herein-described abstract-book consisting of opposing pages, upon one of which, inside of its marginal lines, are formed vertical and horizontal lines or cross-sectioning, and the graduated degrees of a circle bounding the periphery of the cross-sectioned portion and extending both right and left from a line which passes vertically through the center of the cross-sectioned portion of the sheet; and the other page being ruled for entries of references to instruments affecting the title to the lands contained in the sections upon the opposite page.

2. In an abstract-book of records, a page or sheet having its body, inside of its margins, provided with vertical and horizontal lines, or cross-sectioning, the graduated degrees of a circle marked around the edges of the cross-sectioned portion and extending both right and left from a line which passes vertically through the center of the ruled portion, and radiating from the point where the central horizontal line of cross-sectioning intersects the central vertical line thereof, and vertical series of subdivisions at the sides of the page, outside of the series of graduated degrees, adapted to receive the symbols by which independent divisions are designated.

In witness whereof I have hereunto set my hand.

SAML. H. RICE.

Witnesses:
R. E. DONOHOE,
H. B. SMITH.